US012065880B2

(12) United States Patent
Gerbrandt

(10) Patent No.: US 12,065,880 B2
(45) Date of Patent: Aug. 20, 2024

(54) LADDER STABILIZER APPARATUS

(71) Applicant: Albert Larry Gerbrandt, Headingley (CA)

(72) Inventor: Albert Larry Gerbrandt, Headingley (CA)

( * ) Notice: Subject to any disclaimer, the term of this patent is extended or adjusted under 35 U.S.C. 154(b) by 910 days.

(21) Appl. No.: 17/112,265

(22) Filed: Dec. 4, 2020

(65) Prior Publication Data

US 2021/0180404 A1 Jun. 17, 2021

Related U.S. Application Data

(60) Provisional application No. 62/947,065, filed on Dec. 12, 2019.

(51) Int. Cl.
*E06C 7/42* (2006.01)
*E06C 1/04* (2006.01)

(52) U.S. Cl.
CPC ................ *E06C 7/423* (2013.01); *E06C 1/04* (2013.01); *E06C 7/42* (2013.01)

(58) Field of Classification Search
CPC ... E06C 7/423; E06C 1/04; E06C 1/12; E06C 7/42; E06C 1/16; E06C 1/18; E06C 1/20; E06C 1/22
See application file for complete search history.

(56) References Cited

U.S. PATENT DOCUMENTS

| | | | | | |
|---|---|---|---|---|---|
| 3,768,592 | A * | 10/1973 | Higgins | E06C 1/16 | 248/238 |
| 4,147,231 | A * | 4/1979 | Chantler | E06C 7/423 | 182/172 |
| 4,632,220 | A * | 12/1986 | Murrell | E06C 7/44 | 182/172 |
| 4,723,629 | A * | 2/1988 | Vanden Hoek | E06C 7/423 | 182/172 |
| 6,053,284 | A * | 4/2000 | Fountain | E06C 7/42 | 182/180.2 |
| 9,803,422 | B2 * | 10/2017 | Johnson | E06C 1/397 | |
| 10,822,874 | B2 * | 11/2020 | Green | E06C 1/397 | |
| 10,865,602 | B1 * | 12/2020 | Varshavsky | E06C 7/04 | |
| 2010/0038172 | A1 * | 2/2010 | Ralston | E06C 7/18 | 182/107 |

(Continued)

FOREIGN PATENT DOCUMENTS

| | | | | |
|---|---|---|---|---|
| CN | 108952547 A | * 12/2018 | | E06C 1/18 |
| DE | 202015103639 U1 | * 11/2016 | | E06C 1/12 |

(Continued)

*Primary Examiner* — Colleen M Chavchavadze
*Assistant Examiner* — Steven D Yates
(74) *Attorney, Agent, or Firm* — Ryan W. Dupuis; Michael R. Williams; Ade & Company Inc.

(57) ABSTRACT

A stabilizer apparatus has a mounting frame that mounts onto a ladder so as to be longitudinally slidable along the rails of the ladder. Stabilizer legs are pivotally supported on the mounting frame between a stored position in which the legs are supported alongside the mounting frame and a working position protruding outwardly from the mounting frame. A screw clamp type retaining mechanism selectively prevents longitudinal displacement of the mounting frame relative to the ladder for stabilising the ladder while in the working position of the legs.

18 Claims, 6 Drawing Sheets

(56) References Cited

U.S. PATENT DOCUMENTS

| | | | | |
|---|---|---|---|---|
| 2010/0252364 | A1* | 10/2010 | Vestal | E06C 1/22 182/108 |
| 2010/0300805 | A1* | 12/2010 | Moss | E06C 1/12 182/172 |
| 2015/0167385 | A1* | 6/2015 | Green | E06C 7/44 29/434 |
| 2016/0024844 | A1* | 1/2016 | Neubauer | E06C 1/38 182/106 |
| 2017/0335626 | A1* | 11/2017 | Saxby | E06C 7/423 |
| 2019/0136620 | A1* | 5/2019 | Leng | E06C 1/125 |
| 2020/0141185 | A1* | 5/2020 | Lin | E06C 7/16 |

FOREIGN PATENT DOCUMENTS

| | | | | |
|---|---|---|---|---|
| EP | 0172284 | A1 * | 2/1986 | |
| EP | 3981944 | A1 * | 4/2022 | E06C 1/22 |
| JP | 2004218355 | A * | 8/2004 | E06C 1/393 |
| KR | 20040067814 | A * | 7/2004 | |
| KR | 2017088532 | A * | 8/2017 | E06C 1/18 |

* cited by examiner

LADDER STABILIZER APPARATUS

This application claims the benefit under 35 U.S.C. 119(e) of U.S. provisional application Ser. No. 62/947,065, filed Dec. 12, 2019.

FIELD OF THE INVENTION

The present invention relates to an apparatus for stabilizing a ladder, for example an extension ladder, which is commonly deployed at a slope leaning against a supporting structure, and more particularly the present invention relates to an apparatus which can be attached to the ladder and which includes stabilizer legs which provide additional engagement with the ground to stabilize movement of the ladder relative to the ground in use.

BACKGROUND

In some instances when a ladder is supported against a structure at an inclination, the ladder may have poor traction with the ground such that the bottom of the ladder slides outwardly along the ground relative to the structure against which the ladder is supported, possibly resulting in injury to a user of the ladder. Various attempts have been made to improve the stability and traction of the bottom of the ladder relative to the ground to prevent such occurrences as described in the following documents: United States Patent Application Publication No 2015/0167385 by Green et al; United States Patent Application Publication No. 2011/011678 by Sheffield; U.S. Pat. No. 6,105,722 by Taylor; U.S. Pat. No. 5,918,698 by Lunn; and U.S. Pat. No. 3,768,592 by Higgins. None of the proposed devices in the prior art can be readily supported on a ladder with minimal or no modification of the ladder required and in a manner which permits the device to be readily adjusted and positioned relative to the ladder without the need for any special tools.

SUMMARY OF THE INVENTION

According to one aspect of the invention there is provided a ladder stabilizer apparatus for use in stabilizing a ladder comprising two rails extending in a longitudinal direction and a plurality of rungs connected between the rails at longitudinally spaced apart positions along the rails, the apparatus comprising:

a mounting frame including rail mounts adapted to be mounted onto the rails so as to be longitudinally slidable along the rails;

at least one stabilizer leg supported on the mounting frame so as to be longitudinally slidable along the rails with the mounting frame;

said at least one stabilizer leg including a first end pivotally coupled to the mounting frame and a second end opposite the first end so as to be arranged to engage the ground when stabilizing the ladder;

said at least one stabilizer leg being pivotal relative to the mounting frame between a stored position in which the at least one stabilizer leg is supported alongside the mounting frame such that the second end of the at least one stabilizer leg is in proximity to the rails of the ladder and a working position protruding outwardly from the mounting frame such that the second end of the at least one stabilizer leg is spaced outwardly from the rails of the ladder; and a retaining mechanism supported on the mounting frame, the retaining mechanism being adapted to prevent longitudinal displacement of the mounting frame relative to the ladder in at least one direction.

According to a second aspect of the present invention there is provided a ladder stabilizer apparatus in combination with a ladder comprising two rails extending in a longitudinal direction and a plurality of rungs connected between the rails at longitudinally spaced apart positions along the rails, the apparatus comprising:

a mounting frame including rail mounts mounted onto the rails so as to be longitudinally slidable along the rails;

at least one stabilizer leg supported on the mounting frame so as to be longitudinally slidable along the rails with the mounting frame;

said at least one stabilizer leg including a first end pivotally coupled to the mounting frame and a second end opposite the first end so as to be arranged to engage the ground when stabilizing the ladder;

said at least one stabilizer leg being pivotal relative to the mounting frame between a stored position in which the at least one stabilizer leg is supported alongside the mounting frame such that the second end of the at least one stabilizer leg is in proximity to the rails of the ladder and a working position protruding outwardly from the mounting frame such that the second end of the at least one stabilizer leg is spaced outwardly from the rails of the ladder; and a retaining mechanism supported on the mounting frame, the retaining mechanism preventing longitudinal displacement of the mounting frame relative to the ladder in at least one direction when the retaining mechanism is engaged with the ladder.

Preferably the at least one stabilizer leg comprises a pair of stabilizer legs which are supported on the mounting frame such that the stabilizer legs are adapted to be longitudinally slidable together with the mounting frame relative to the ladder.

Preferably the at least one stabilizer leg is adapted to be movable with the mounting frame relative to the ladder in the stored position of the stabilizer leg from a first position of the mounting frame in which the second end of the stabilizer leg protrudes beyond an end of the ladder and a second position of the mounting frame relative to the ladder in which the second end of the stabilizer leg does not protrude beyond the end of the ladder.

Preferably the at least one stabilizer leg is further coupled to the mounting frame by a folding brace, in which the folding brace is pivotally coupled at a first end of the brace to the mounting frame at a location spaced from the first end of the stabilizer leg and being pivotally coupled at a second end of the brace to the stabilizer leg at a location spaced from the first end of the stabilizer leg, whereby the folding brace is movable between a folded condition when the stabilizer leg is in the stored position and an extended condition when the stabilizer leg is in the working position.

When each of the rails of the ladder has a side wall portion mounting the rungs thereon and a rear flange protruding inwardly towards the other rail at a location spaced from the rungs to define a frame gap between the rear flange of each rail and the rungs, the apparatus may be arranged so that the rail mounts of the mounting frame comprise support flanges supported at laterally opposing sides of the mounting frame within a common support plane, in which the flanges protrude outwardly from the mounting frame so as to be adapted to be inserted within the frame gap of the rails of the ladder respectively, whereby the mounting frame is supported for longitudinal sliding along the rails by the support flanges within the frame gaps of the rails.

The support flanges are preferably supported in fixed relation to one another such that the mounting frame can only be removed from the rails of the ladder by longitudinally sliding the mounting frame beyond one end of the ladder through open ends of the rails respectively.

The retaining mechanism preferably comprises a clamp supported on the mounting frame so as to be operable between a clamped position which restricts movement of the mounting frame relative to the ladder and a released position in which the clamp does not interfere with longitudinal sliding of the mounting frame relative to the ladder.

The clamp is preferably operable in the clamped position to fix the mounting frame relative to the ladder at any selected one of a plurality of longitudinal positions along the ladder.

The clamp may be supported on the mounting frame at a location spaced above the pivotal connection of the first end of said at least one stabilizer leg.

According to a first illustrated embodiment of the present invention, the clamp comprises a set screw supported on the mounting frame so as to be rotated about a screw axis oriented perpendicularly to a common plane of the rails of the ladder.

According to a second embodiment of the present invention, the clamp comprises a screw assembly extending in a lateral direction between two rail mounts of the mounting frame at laterally opposing sides of the mounting frame, in which the screw assembly is rotatable about a screw axis oriented parallel to a common plane of the rails so as to be arranged to apply a clamping pressure to clamp the rail mounts onto the respective rails of the ladder.

BRIEF DESCRIPTION OF THE DRAWINGS

Two embodiments of the invention will now be described in conjunction with the accompanying drawings in which.

In the drawings like characters of reference indicate corresponding parts in the different figures.

DETAILED DESCRIPTION

Figure 1:
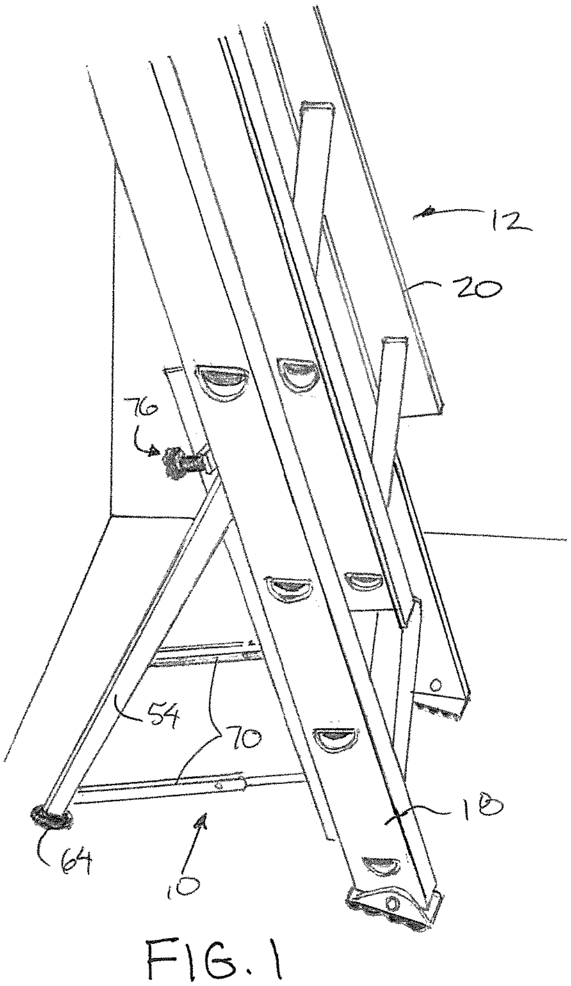
FIG. 1 is a perspective view of the stabilizer apparatus according to a first embodiment, shown in a working position relative to a ladder in use leaning against a structure.

Referring to the accompanying figures there is illustrated a ladder stabilizing apparatus generally indicated by reference numeral 10. The apparatus 10 is particularly suited for stabilizing a ladder 12, for example an extension ladder, when the ladder is supported at an upward slope leaning against a supporting structure such as a building. In a typical example, the ladder is supported at an inclination of near 75 degrees from horizontal and the stabilizing apparatus is supported on the ladder to extend downwardly and forwardly towards the structure against which the ladder is leaning for engagement of the stabilizing apparatus with the ground surface upon which the ladder is supported.

A typical ladder 12 includes two rails 14 which are supported in parallel relation to one another at laterally opposing sides of the ladder to extend longitudinally along a full length of the ladder. A plurality of rungs 16 are mounted between the rails at longitudinally spaced positions so as to be oriented parallel to one another and perpendicularly to the rails.

In the illustrated embodiment, the ladder 12 comprises an extension ladder having a lower section 18 and an upper section 20 which is mounted to be longitudinally slidable relative to the lower section for varying the overall length of the ladder. In this instance, each of the rails 14 includes a lower rail section 22 forming part of the lower section of the ladder and an upper rail section 24 forming part of the upper section of the ladder. The rungs 16 connected between the lower rail sections of the lower section lie in a first common plane with one another while the rungs 16 of the upper section are connected between the upper rail sections 24 lie within a second common plane lying parallel and spaced from the first common plane of the rungs of the lower section.

Each of the lower rail sections comprises a channel having a C shaped cross-section with an open side of the channel facing inwardly towards the opposing lower rail section. Each lower rail section thus comprises (i) a side wall portion 26 mounting the rungs thereon such that the rungs are perpendicular to the side wall portion, (ii) a rear flange 28 extending inwardly from the rear edge of the side wall portion 26, and (iii) a front flange 30 extending inwardly from the front edge of the side wall portion 26. The rear flange 28 is spaced outwardly from the rear side of the rungs 16 to define a rear frame gap between the rear flange 28 and the rungs at the rear side of the ladder. Similarly, the front flange 30 is spaced outwardly from the front side of the rungs 16 to define a front frame gap between the front flange 30 and the rungs at the front side of the ladder.

Each of the upper rail sections 24 also comprises a channel having a C shaped cross-section, but with the open side of the channel facing outwardly away from the opposing upper rail section. Each upper rail section thus comprises (i) a side wall portion 32 mounting the rungs thereon such that the rungs are perpendicular to the side wall portion, (ii) a rear flange 34 extending outwardly from the rear edge of the side wall portion 32, and (iii) a front flange 36 extending outwardly from the front edge of the side wall portion 32.

The side wall portions 32 of the upper section are spaced apart from one another by a lateral distance which is less than the lateral distance between the inner free edges of the front flanges 30 to enable the upper section of the ladder to be received between the rails of the lower section of the ladder. Furthermore, the rear flanges 34 of the upper section are received within the front frame gaps of the lower section of the ladder such that the upper section of the ladder is coupled to the lower section of the ladder for longitudinal sliding movement of the upper and lower ladder sections relative to one another.

A pair of feet 38 are pivotally coupled on the bottom ends of the lower rail sections 22 respectively. The attachment of the feet to the lower rail sections partly obstructs the open bottom end of the front frame gaps to retain the upper section 20 of the ladder longitudinally slidable along the lower section 18 such that the upper section of the ladder cannot be displaced below the bottom end of the lower section of the ladder. The feet can be pivoted such that the open bottom ends of the rear frame gaps are exposed for mounting of the apparatus 10 therein as described in further detail below.

The ladder further comprises a conventional latching mechanism (not shown) for supporting the upper section 20 of the ladder relative to the lower section 18 of the ladder at a selected height relative to one another.

Although two embodiments are shown in the accompanying figures, the features in common with the various embodiments will first be described herein.

The apparatus 10 according to the present invention includes a mounting frame 40 generally comprised of two frame members 42 extending in a longitudinal direction of the frame in parallel relation to one another at laterally opposing sides of the frame. One or more cross members 44 are coupled between the frame members such that the frame members 42 are coupled in fixed relation to one another. A lowermost one of the cross members 44 is joined between the frame members 42 in proximity to a bottom end thereof to support the bottom ends of the frame members at a fixed lateral spacing relative to one another.

Each frame member 42 extends from a top first end 46 to a bottom second end 48. Each frame member is an angle iron including a support flange 50 and an inner flange 52 mounted in perpendicular relation to one another along the full length of the frame member. The frame members 42 are mounted so that the support flanges 50 lie in a common support plane relative to one another while the inner flanges 52 project perpendicularly outward from the common plane of the support flanges 50. More particularly, the inner flanges protrude from the inner edges of the respective support flanges along the full length thereof.

The inner flanges 52 are parallel to one another and spaced apart from one another by a lateral distance which fits between the inner edges of the rear flanges 28 of the lower section of the ladder. The frame members are supported by the cross members such that the support flanges define an overall width between the outer edges thereof in the lateral direction which is greater than the lateral distance between the inner edges of the rear flanges 28 but which is less than the lateral distance between the side wall portions 26 of the lower section. In this manner, the support flanges 50 of the mounting frame can be received within the rear frame gaps between the rear flanges 28 of the lower rail sections and the rungs 16 of the ladder so as to retain the mounting frame mounted onto the lower section 18 of the ladder while enabling the mounting frame to be longitudinally slidable along the lower section of the ladder within the rear frame gap.

The mounting frame is mounted onto the ladder by pivoting the feet 38 on the lower section 18 of the ladder to expose the open end of the rear frame gap so that the support flanges 50 can be inserted into the rear frame gaps through the open bottom ends thereof. Once the feet 38 of the ladder are pivoted into a level orientation, the mounting frame is effectively retained for sliding movement along the length of the lower section 18 of the ladder.

The apparatus 10 further includes two stabilizer legs 54 in which each leg is supported on a respective one of the frame members so that the legs are provided at laterally opposing sides of the mounting frame. Each leg also comprises an angle iron having an inner flange 56 and an outer flange 58 mounted in perpendicular relation to one another to extend the full length of the leg. More particularly each leg extends in a longitudinal direction from a first end 60 pivotally coupled to the respective frame member of the mounting frame to an opposing second end 62 forming a foot 64 thereon suitable for engaging the ground in use.

A crossbar 66 is coupled between the stabilizer legs 54 in the lateral direction, at a location in proximity to the second end 62 of the legs. An angled brace 68 is fixed between an intermediate location on the crossbar and one of the stabilizer legs 54 to form a triangular frame portion which maintains the stabilizer legs in parallel relation to one another and in perpendicular relation to the crossbar. The fixed connection of the crossbar 66 also ensures that the legs 54 are always movable together relative to the mounting frame.

Each of the stabilizer legs is oriented such that the inner flange 56 thereof is parallel to and pivotally coupled adjacent to a corresponding inner flange 52 of the mounting frame. More particularly the inner flanges of the stabilizer legs are supported against the outward facing surfaces of the inner flanges 52 of the frame members of the mounting frame by a hinge pin coupled through the flanges. The outer flange 58 of each stabilizer leg extends laterally outward from one edge of the corresponding inner flange 56.

The pivotal connection of each stabilizer leg to the mounting frame is located at the first end 60 of the stabilizer leg which is supported at an intermediate location along a corresponding one of the frame members 42 of the mounting frame at a location which is closer to the first end then the second end of the mounting frame but which is spaced below the first end of the mounting frame.

A folding brace 70 is operatively connected between each stabilizer leg 54 and the corresponding one of the frame members 42 of the mounting frame. Each folding brace 70 comprises two links which are hinged to one another at respective inner ends thereof. The first link 72 of the folding brace is pivotally coupled at the outer end thereof adjacent the second end of the leg. The outer end of the second link 74 at the opposing end of the folding brace is pivotally coupled onto the corresponding frame member 42 of the mounting frame adjacent the second end thereof.

The stabilizer legs are arranged to be pivoted between a stored position and a working position. In the stored position, the legs extend alongside the mounting frame so as to be nearly parallel to the frame members, and in turn be nearly parallel to the common plane of the rails of the ladder and/or the common plane of the rungs of the lower section of the ladder such that the second ends of the stabilizer legs are located in close proximity to the mounting frame and the ladder upon which the mounting frame is supported. In the stored position, the braces are folded such that the first and second links extend generally alongside one another.

In the working position, the stabilizer legs protrude outwardly from the mounting frame and the ladder such that the second ends of the stabilizer legs are spaced outwardly from the common plane of the frame members of the mounting frame and spaced outwardly from the common plane of either the rails of the ladder or the rungs of the lower section of the ladder. The braces are extended in the working position of the legs such that the first and second links are in line with one another and the braces are generally supported under tension in the working position.

The mounting frame is typically supported so as to be longitudinally slidable along the ladder between a first position for stabilizing the ladder at a selected one of numerous possible elevations along the ladder and a second position in which the apparatus is stored out of use on the ladder or is removed from the ladder. More particularly in the first position, the second end of the frame is located adjacent to the bottom end of the ladder such that the bottom ends of the legs can engage the ground when the ladder is in use at a recommended slope leaning against a structure with the legs providing stabilization in the working position thereof. Alternatively, when the stabilizer legs are folded to the stored position, with the mounting frame remaining in the first position, the second ends of the legs may be in proximity to or protrude beyond the bottom end of the ladder.

In the second position, the mounting frame may be longitudinally displaced downwardly along the ladder to remove the mounting frame from the ladder. Alternatively, the mounting frame may be longitudinally displaced upwardly along the ladder relative to the first position sufficiently that if the stabilizer legs remain folded in the stored position, the second ends of the stored legs are retracted and/or spaced upwardly relative to the bottom end of the ladder in a non-protruding relationship relative to the bottom end of the ladder.

A retaining mechanism is used to fix the mounting frame relative to the ladder in either one of the first or second positions or a plurality of intermediate positions therebetween. The retaining mechanism may take a variety of forms including latching devices which latch onto the rungs of the ladder for restricting movement of the mounting frame relative to the ladder in either one direction or two directions as required. When stabilizing a ladder in use, the retaining mechanism is only required to restrict the mounting frame from moving upwardly along the lower section of the ladder.

Figure 2:
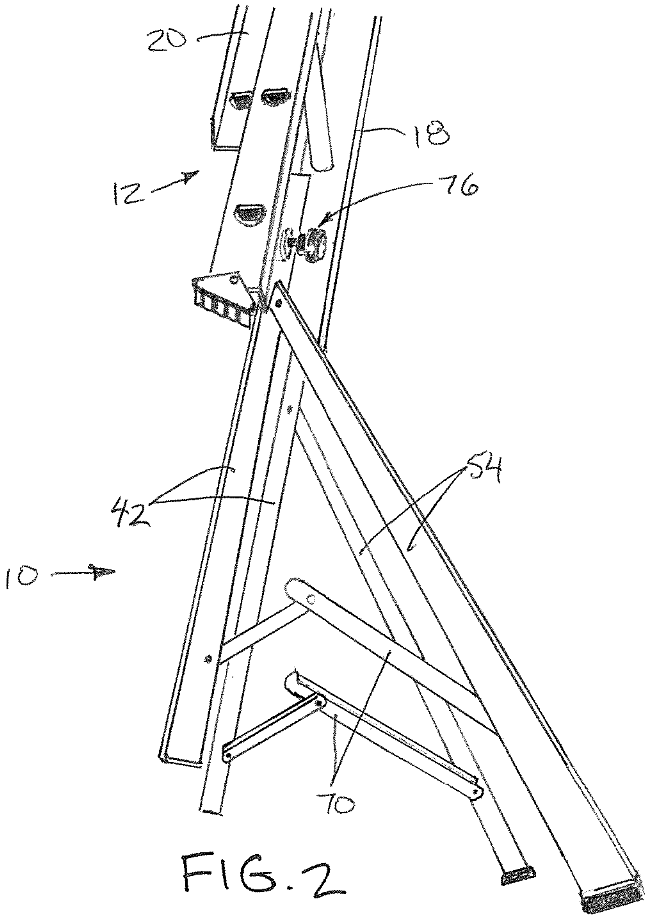
FIG. 2 is a perspective view of the stabilizer apparatus according to the first embodiment of FIG. 1 as it is slidably removed from or inserted onto a ladder.
Figure 3:
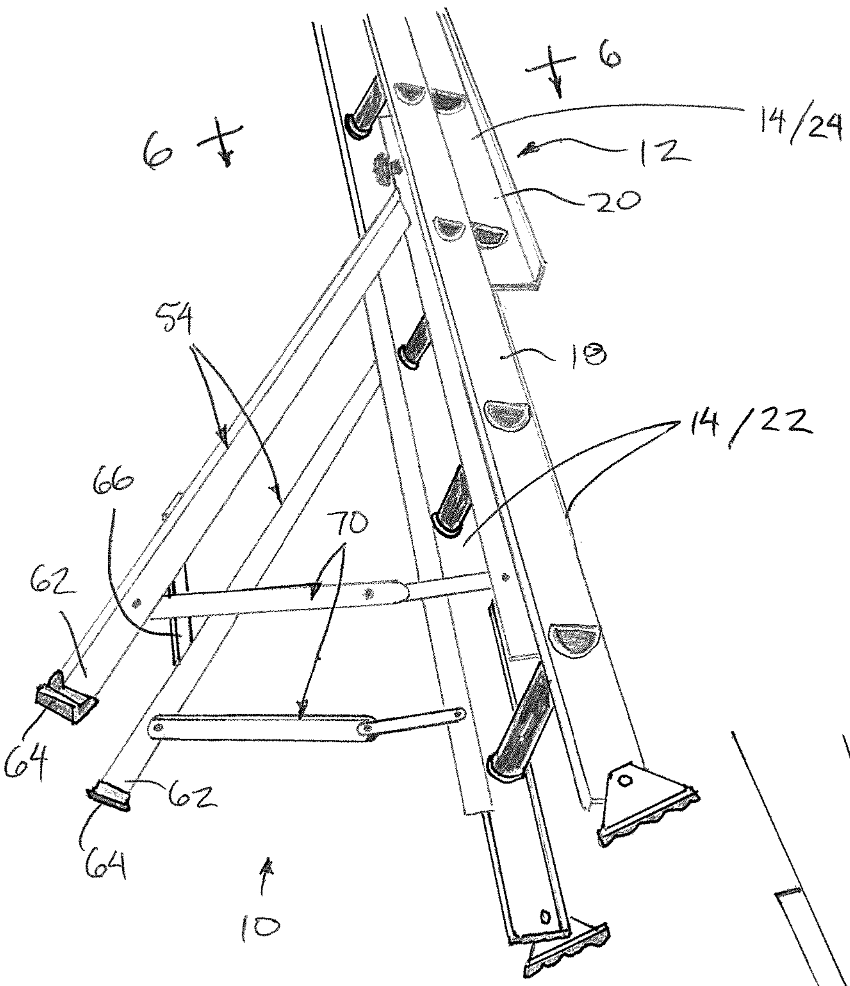
FIG. 3 is a bottom perspective view of the stabilizer apparatus according to the first embodiment of FIG. 1 in a working position on a ladder.
Figure 4:
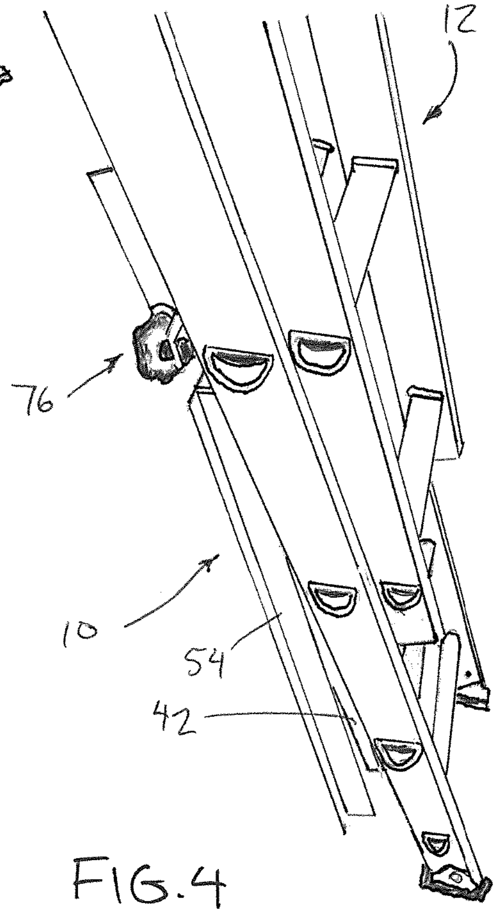
FIG. 4 is a perspective view of the stabilizer apparatus according to the first embodiment of FIG. 1, shown folded into a stored position alongside the ladder.
Figure 5:
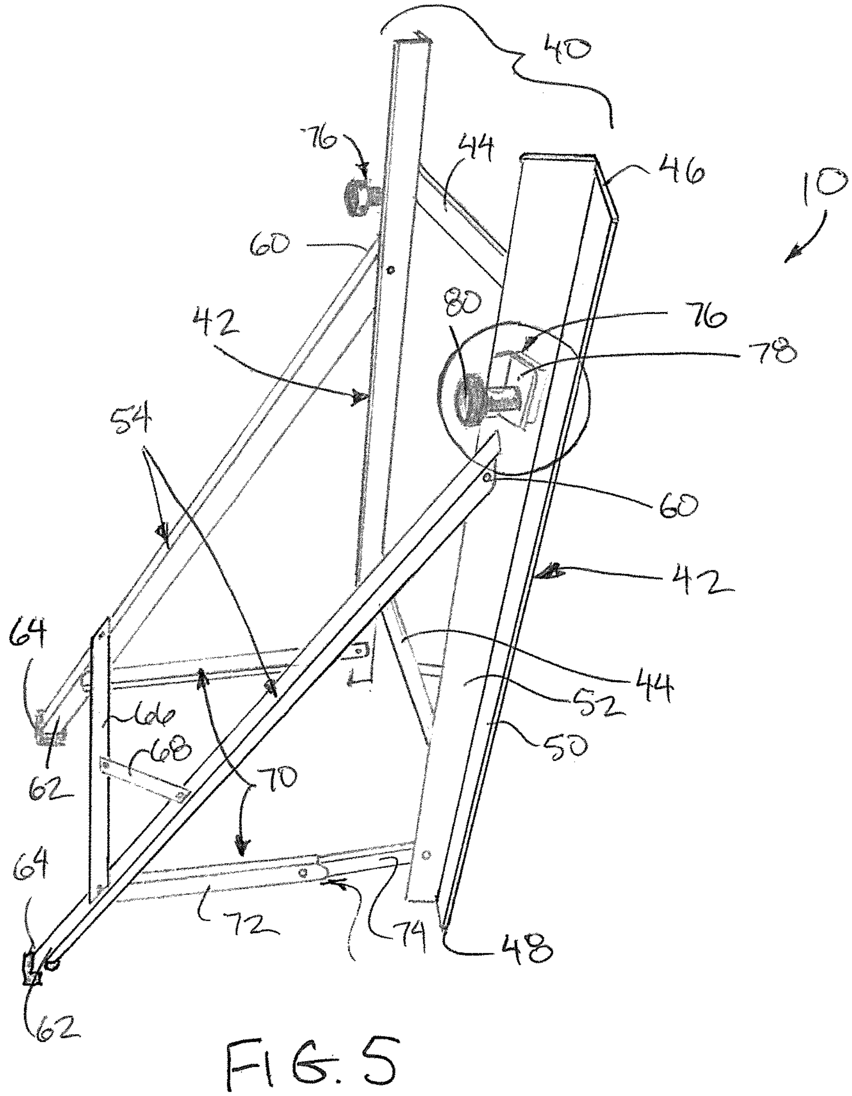
FIG. 5 is a perspective view of the stabilizer apparatus according to the first embodiment of FIG. 1, shown removed from the ladder.
Figure 6:
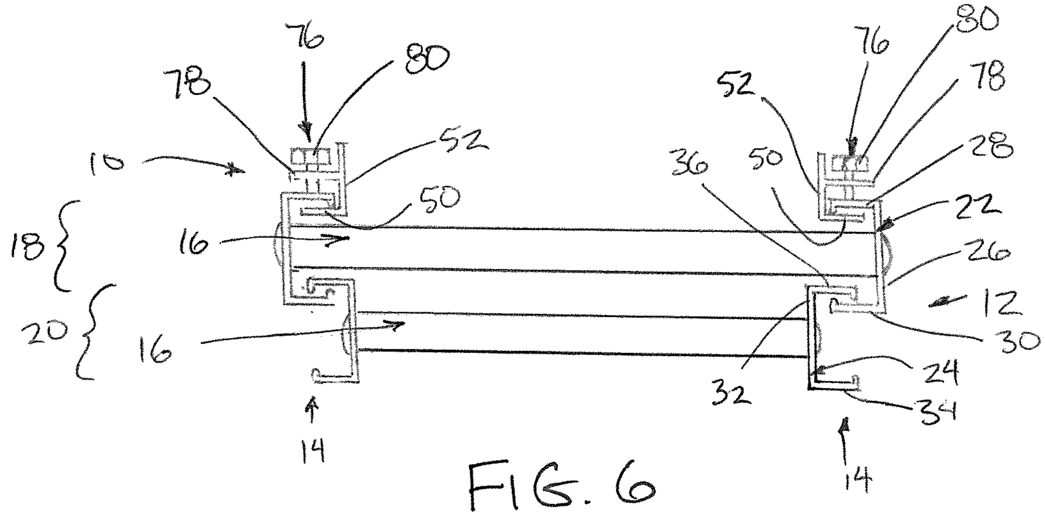
FIG. 6 is a sectional view along the line 6-6 in FIG. 3, in which the stabilizer legs have been removed for illustrative purposes.

In the first illustrated embodiment of FIGS. 1 through 6, the retaining mechanism comprises two clamps 76 which are mounted on the two frame members 42 respectively adjacent the top first ends 46 thereof so as to be positioned above the pivotal connection to the first ends 60 of the stabilizer legs onto the frame members. Each clamp 76 includes a mounting flange 78 which is fixed onto the inner flange 52 of the respective frame member at a location which is parallel and spaced from the support flange 50 of the frame member to define a rail gap therebetween which receives the rear flange 28 of a corresponding lower rail section 22 of the ladder therein.

Each clamp 76 generally comprises a set screw which is threaded into a threaded bore formed in the mounting flange 78. The clamp is thus rotatable about a screw axis which is oriented generally perpendicularly to the mounting flange 78 and the support flange 50 of the corresponding frame member of the mounting frame. A handle 80 is mounted on the outer end of the clamp to enable an operator to manually rotate the screw of the clamp which acts to displace the clamp axially inward and outward relative to the support flange 50. Rotating the clamp in a first direction displaces the clamp inwardly towards the support flange 50 towards a clamped position in which the rear flange 28 of the ladder is clamped between the clamp and the support flange 50. Rotating the clamp in the opposing direction displaces the clamp outward and away from the support flange 50 so that the rear flange of the ladder is freely slidable within the rail gap in the mounting frame 40 so that the mounting frame can be displaced along the ladder.

The apparatus 10 is initially mounted onto a ladder by sliding the support flanges of the mounting frame upwardly through the open bottom end of the frame gaps at the rear of the lower section 18 of the ladder. With the clamps remaining in the released position, the mounting frame is longitudinally slidable along the length of the lower section of the ladder. To store the apparatus out of use on the ladder, the mounting frame is displaced to the second position thereof relative to the ladder such that the stabilizer legs in the stored position do not protrude beyond the bottom of the ladder. The clamps can be engaged to retain the mounting frame in the second position while the stabilizer legs are stored if desired.

When it is desired to provide stabilization to a ladder in use, the operator typically leans the ladder against a structure at a desired slope to initially set the ladder in place. The stabilizer legs can then be pivoted into the working position thereof with the extension of the folding braces 70 being sufficient to retain the stabilizer legs in the working position. Releasing the clamps 76 then enables the mounting frame to be slidably displaced along the ladder towards the first position thereof in which the bottom ends of the stabilizer legs in the working position engage the ground that the ladder is supported upon. Once the stabilizer legs are engaged with the ground, the clamps 76 are engaged to fix the position of the mounting frame relative to the ladder and restrict longitudinal sliding of the mounting frame relative to the ladder. In this position, if the bottom end of the ladder were to slide along the ground outwardly from the structure upon which the ladder is leaning, the stabilizer legs will firmly engage the ground and prevent further outward sliding of the ladder along the ground relative to the structure.

Figure 7:
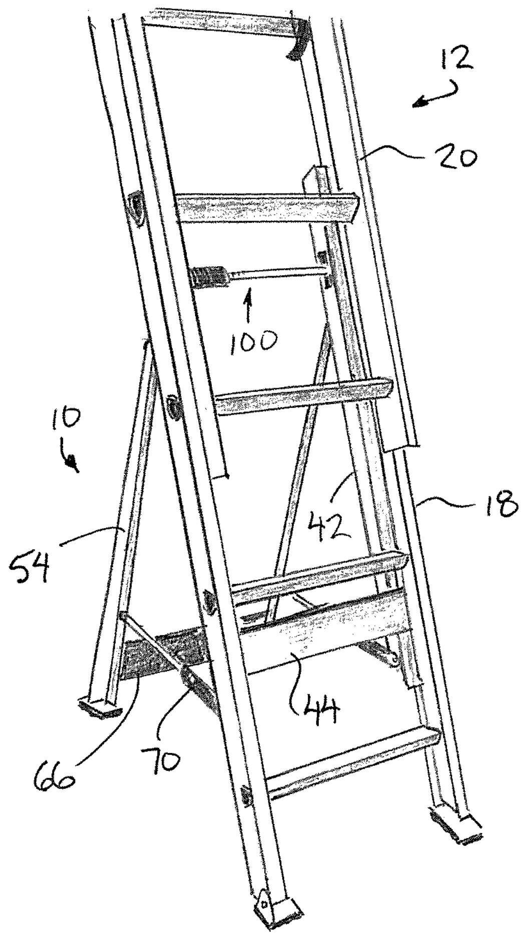
FIG. 7 is a front perspective view of the stabilizer apparatus according to a second embodiment, shown in a working position relative to a ladder in use leaning against a structure.
Figure 8:
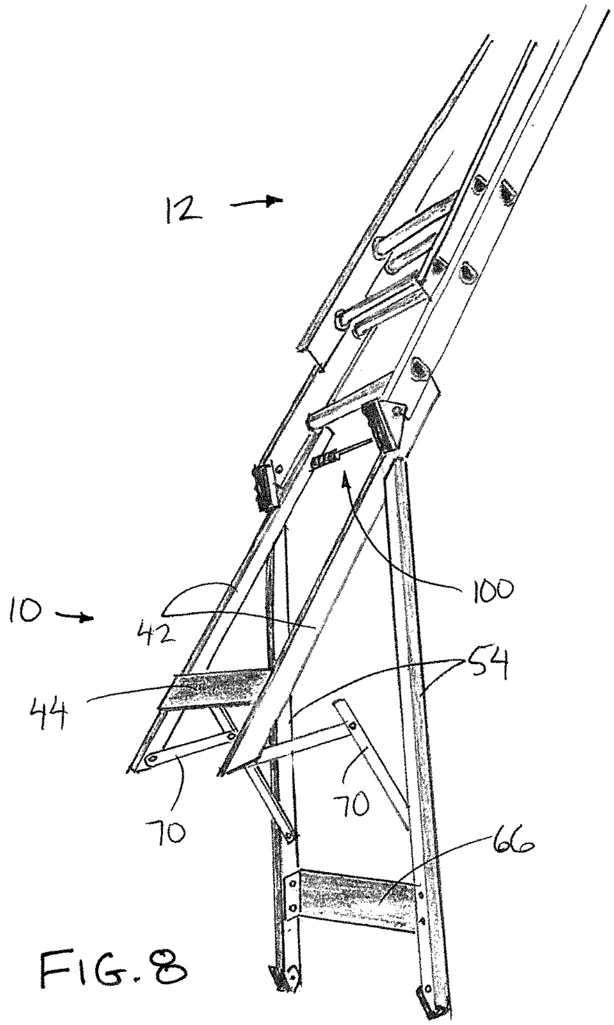
FIG. 8 is a perspective view of the stabilizer apparatus according to the second embodiment of FIG. 7 as it is slidably removed from or inserted onto a ladder.
Figure 9:
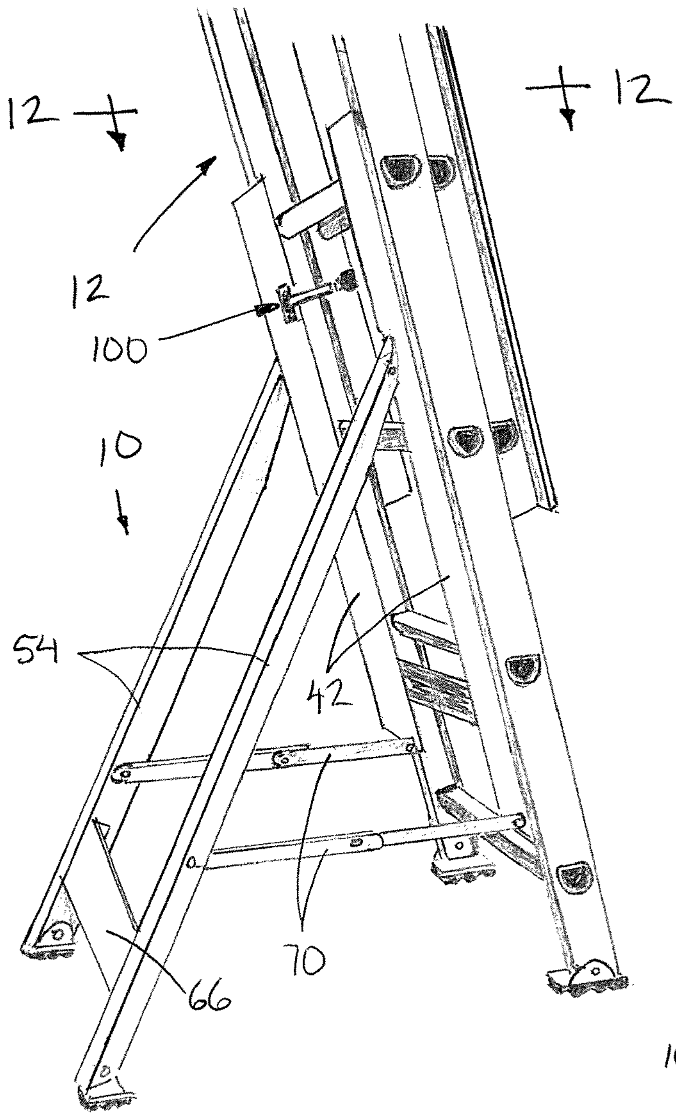
FIG. 9 is a rear perspective view of the stabilizer apparatus according to the second embodiment of FIG. 7, shown in a working position on a ladder.
Figure 10:
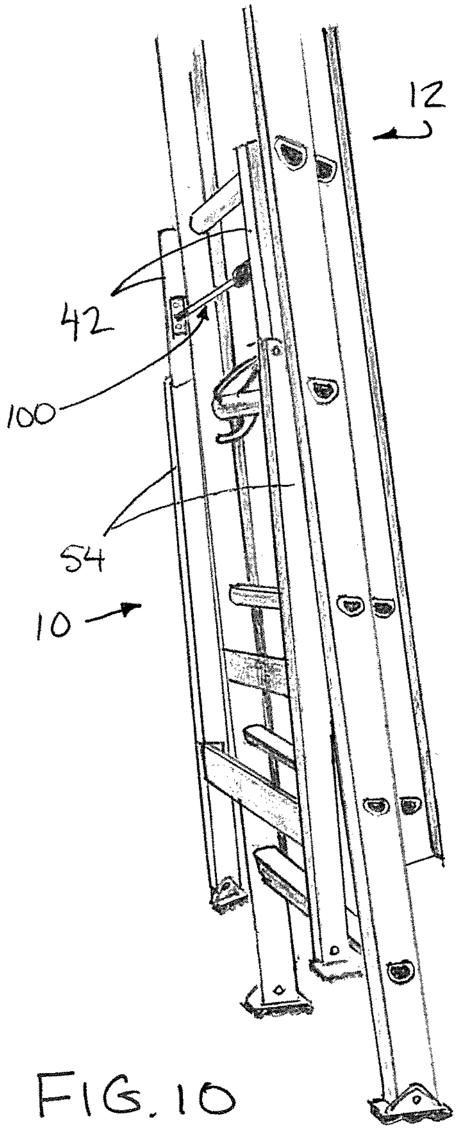
FIG. 10 is a perspective view of the stabilizer apparatus according to the second embodiment of FIG. 7, shown folded into a stored position alongside the ladder.
Figure 11:
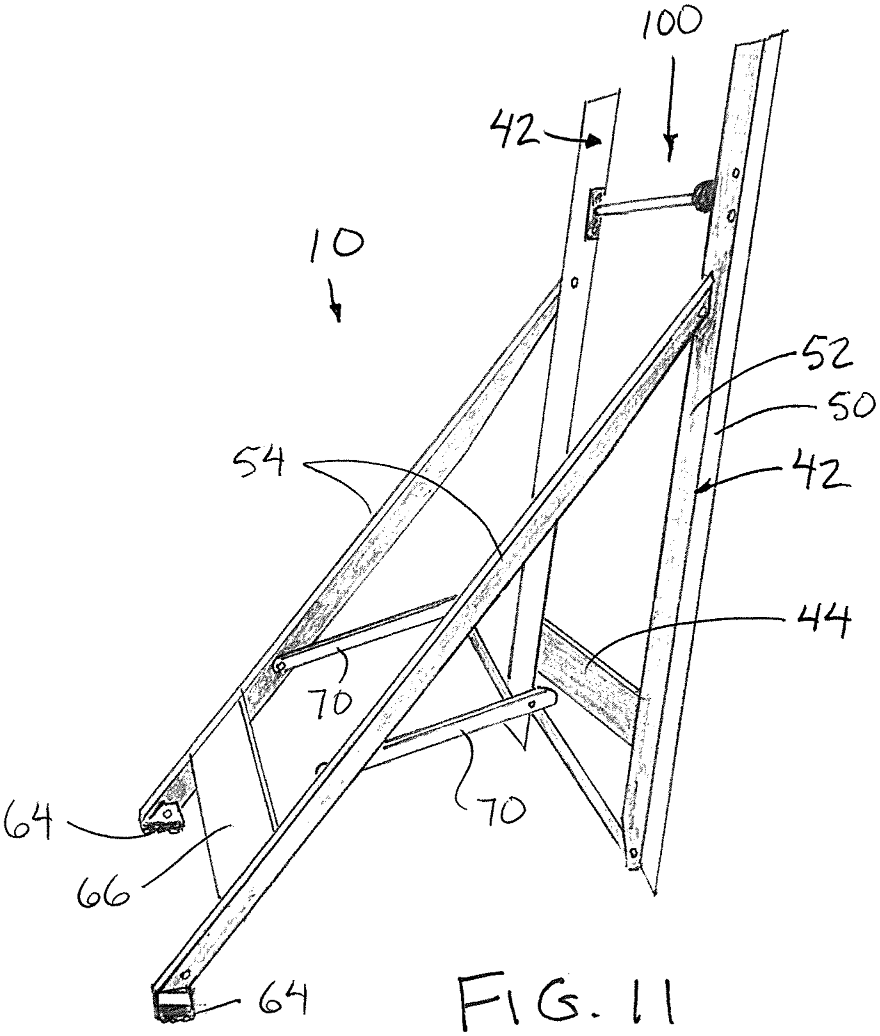
FIG. 11 is a perspective view of the stabilizer apparatus according to the second embodiment of FIG. 7, shown removed from the ladder.
Figure 12:
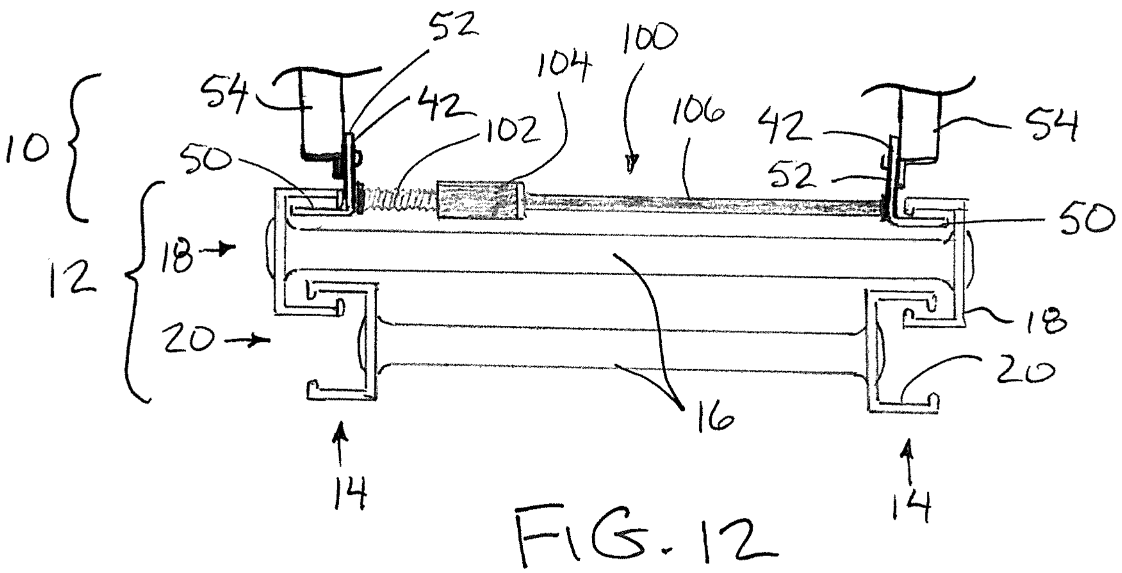
FIG. 12 is a sectional view of the stabilizer apparatus along the line 12-12 in FIG. 9.

Turning now to the second illustrated embodiment of FIG. 7 through 12, in this instance, the mounting frame includes a single cross member 44 connected between the frame members 42 in proximity to the bottom ends thereof. The retaining mechanism in the second embodiment comprises a screw clamp assembly 100 connected between the two frame members 42 of the mounting frame in proximity to the top end at a location above the pivotal connection of the stabilizer legs 54 to the frame members 42 respectively.

The screw clamp assembly 100 includes a threaded shaft 102 coupled to one of the frame members 42 and an internally threaded collar 104 connected by a mounting shaft 106 to the other one of the frame members 42 of the mounting frame. The threaded shaft 102 is threadably connected to the threaded collar 104 for relative rotation therebetween about a common screw axis of the screw clamp assembly. The threaded shaft 102, the collar 104 and the mounting shaft 106 lie coaxially with one another along the screw axis extending in a lateral direction between the frame members 42. The threaded shaft 102 may be fixed to the mounting frame, while the collar 104 is rotatably supported on the mounting shaft 106 so that the collar can be rotatable relative to the threaded shaft to expand and contract an overall length of the screw clamp assembly 100 in the lateral direction of the screw axis.

Due to the absence of any cross members 44 connected between the top ends of the frame members 42, and use of the screw assembly 100 as the only connection between the frame members 42 at the top end thereof, varying the length of the screw assembly 100 in the lateral direction acts to expand and contract the lateral spacing between the top ends of the frame members 42.

When supported on the ladder, expanding the lateral spacing between the frame members 42 results in the frame members being urged outwardly and away from one another into engagement with corresponding inner sides of the rails of the ladder. The screw assembly thus functions as an expandable clamp that can be frictionally clamped between opposing rails of the ladder as the screw assembly is expanded in length. Alternatively, the clamping pressure can be released by rotating the collar in the opposing direction to contract the length of the screw assembly and thus contract the lateral spacing between the frame members 42 to release the clamping pressure of the frame members 42 against the rails of the ladder respectively.

With the exception of the configuration of the retaining mechanism, the mounting frame according to the second embodiment is mounted onto the ladder, clamped in fixed relation to the ladder in working or stored positions, and/or removed from the ladder identically to the first embodiment as described above.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A ladder stabilizer apparatus for use in stabilizing a ladder comprising two rails extending in a longitudinal direction and a plurality of rungs connected between the rails at longitudinally spaced apart positions along the rails wherein each of the rails has a side wall portion mounting the rungs thereon and a rear flange protruding inwardly towards the other rail at a location spaced from the rungs to define a frame gap between the rear flange of each rail and the rungs, the apparatus comprising:

a mounting frame including rail mounts adapted to be mounted onto the rails so as to be longitudinally slidable along the rails;

at least one stabilizer leg supported on the mounting frame so as to be longitudinally slidable along the rails with the mounting frame;

said at least one stabilizer leg including a first end pivotally coupled to the mounting frame and a second end opposite the first end so as to be arranged to engage the ground when stabilizing the ladder;

said at least one stabilizer leg being pivotal relative to the mounting frame between a stored position in which the at least one stabilizer leg is supported alongside the mounting frame such that the second end of the at least one stabilizer leg is in proximity to the rails of the ladder and a working position protruding outwardly from the mounting frame such that the second end of the at least one stabilizer leg is spaced outwardly from the rails of the ladder; and a retaining mechanism supported on the mounting frame, the retaining mechanism being adapted to prevent longitudinal displacement of the mounting frame relative to the ladder in at least one direction;

wherein the rail mounts of the mounting frame comprise support flanges supported at laterally opposing sides of the mounting frame within a common support plane, the flanges protruding outwardly from the mounting frame so as to be adapted to be inserted within the frame gap of the rails of the ladder respectively, whereby the mounting frame is supported for longitudinal sliding along the rails by the support flanges within the frame gaps of the rails.

2. The apparatus according to claim 1 wherein said at least one stabilizer leg comprises a pair of stabilizer legs which are supported on the mounting frame such that the stabilizer legs are adapted to be longitudinally slidable together with the mounting frame relative to the ladder.

3. The apparatus according to claim 1 wherein said at least one stabilizer leg is adapted to be longitudinally slidable with the mounting frame relative to the ladder while in the stored position of the stabilizer leg from a first position of the mounting frame in which the second end of the stabilizer leg in the stored position protrudes beyond an end of the ladder and a second position of the mounting frame relative to the ladder in which the second end of the stabilizer leg in the stored position does not protrude beyond the end of the ladder.

4. The apparatus according to claim 1 wherein said at least one stabilizer leg is further coupled to the mounting frame by a folding brace, the folding brace being pivotally coupled at a first end of the brace to the mounting frame at a location spaced from the first end of the stabilizer leg and being pivotally coupled at a second end of the brace to the stabilizer leg at a location spaced from the first end of the stabilizer leg, whereby the folding brace is movable between a folded condition when the stabilizer leg is in the stored position and an extended condition when the stabilizer leg is in the working position.

5. The apparatus according to claim 1 wherein the support flanges are supported in fixed relation to one another such that the mounting frame can only be removed from the rails of the ladder by longitudinally sliding the mounting frame beyond one end of the ladder through open ends of the rails respectively.

6. The apparatus according to claim 1 wherein the retaining mechanism comprises a clamp supported on the mounting frame so as to be operable between a clamped position which restricts movement of the mounting frame relative to the ladder and a released position in which the clamp does not interfere with longitudinal sliding of the mounting frame relative to the ladder.

7. The apparatus according to claim 6 wherein the clamp is operable in the clamped position to fix the mounting frame relative to the ladder at any selected one of a plurality of longitudinal positions along the ladder.

8. The apparatus according to claim 6 wherein the clamp is supported on the mounting frame at a location spaced above the pivotal connection of the first end of said at least one stabilizer leg.

9. The apparatus according to claim 6 wherein the clamp comprises a set screw supported on the mounting frame so as to be rotated about a screw axis oriented perpendicularly to a common plane of the rails of the ladder.

10. The apparatus according to claim 6 wherein the clamp comprises a screw assembly extending in a lateral direction between two rail mounts of the mounting frame at laterally opposing sides of the mounting frame, the screw assembly being rotatable about a screw axis oriented parallel to a common plane of the rails so as to be arranged to apply a clamping pressure to clamp the rail mounts onto the respective rails of the ladder.

11. A ladder stabilizer apparatus in combination with a ladder comprising two rails extending in a longitudinal direction and a plurality of rungs connected between the rails at longitudinally spaced apart positions along the rails wherein each of the rails has a side wall portion mounting the rungs thereon and a rear flange protruding inwardly towards the other rail at a location spaced from the rungs to define a frame gap between the rear flange of each rail and the rungs, the apparatus comprising:

- a mounting frame including rail mounts mounted onto the rails so as to be longitudinally slidable along the rails;
- at least one stabilizer leg supported on the mounting frame so as to be longitudinally slidable along the rails with the mounting frame;
- said at least one stabilizer leg including a first end pivotally coupled to the mounting frame and a second end opposite the first end so as to be arranged to engage the ground when stabilizing the ladder;
- said at least one stabilizer leg being pivotal relative to the mounting frame between a stored position in which the at least one stabilizer leg is supported alongside the mounting frame such that the second end of the at least one stabilizer leg is in proximity to the rails of the ladder and a working position protruding outwardly from the mounting frame such that the second end of the at least one stabilizer leg is spaced outwardly from the rails of the ladder; and
- a retaining mechanism supported on the mounting frame, the retaining mechanism preventing longitudinal displacement of the mounting frame relative to the ladder in at least one direction when the retaining mechanism is engaged with the ladder;
- wherein the rail mounts of the mounting frame comprising support flanges supported at laterally opposing sides of the mounting frame within a common support plane, the flanges protruding outwardly from the mounting frame so as to be adapted to be inserted within the frame gap of the rails of the ladder respectively, whereby the mounting frame is supported for longitudinal sliding along the rails by the support flanges within the frame gaps of the rails.

12. The apparatus according to claim 11 wherein said at least one stabilizer leg comprises a pair of stabilizer legs which are supported on the mounting frame such that the stabilizer legs are adapted to be longitudinally slidable together with the mounting frame relative to the ladder.

13. The apparatus according to claim 11 wherein said at least one stabilizer leg is adapted to be longitudinally slidable with the mounting frame relative to the ladder while in the stored position of the stabilizer leg from a first position of the mounting frame in which the second end of the stabilizer leg protrudes beyond an end of the ladder in the stored position and a second position of the mounting frame relative to the ladder in which the second end of the stabilizer leg in the stored position does not protrude beyond the end of the ladder.

14. The apparatus according to claim 11 wherein said at least one stabilizer leg is further coupled to the mounting frame by a folding brace, the folding brace being pivotally coupled at a first end of the brace to the mounting frame at a location spaced from the first end of the stabilizer leg and being pivotally coupled at a second end of the brace to the stabilizer leg at a location spaced from the first end of the stabilizer leg, whereby the folding brace is movable between a folded condition when the stabilizer leg is in the stored position and an extended condition when the stabilizer leg is in the working position.

15. The apparatus according to claim 11 wherein the support flanges are supported in fixed relation to one another such that the mounting frame can only be removed from the rails of the ladder by longitudinally sliding the mounting frame beyond one end of the ladder through open ends of the rails respectively.

16. The apparatus according to claim 11 wherein the retaining mechanism comprises a clamp supported on the mounting frame so as to be operable between a clamped position which restricts movement of the mounting frame relative to the ladder and a released position in which the clamp does not interfere with longitudinal sliding of the mounting frame relative to the ladder.

17. The apparatus according to claim 16 wherein the clamp is operable in the clamped position to fix the mounting frame relative to the ladder at any selected one of a plurality of longitudinal positions along the ladder.

18. The apparatus according to claim 16 wherein the clamp is supported on the mounting frame at a location spaced above the pivotal connection of the first end of said at least one stabilizer leg.

* * * * *